J. W. COX.
REGISTERING ATTACHMENT FOR FLUSH TANKS.
APPLICATION FILED MAR. 31, 1917.

1,311,876.

Patented Aug. 5, 1919.

Witness
John E Titus

Inventor
James W. Cox
by his Rector Hibben
Attys

UNITED STATES PATENT OFFICE.

JAMES W. COX, OF CHICAGO, ILLINOIS, ASSIGNOR TO PACIFIC FLUSH TANK COMPANY, OF CHICAGO, ILLINOIS, A CORPORATION OF ILLINOIS.

REGISTERING ATTACHMENT FOR FLUSH-TANKS.

1,311,876. Specification of Letters Patent. Patented Aug. 5, 1919.

Application filed March 31, 1917. Serial No. 158,894.

*To all whom it may concern:*

Be it known that I, JAMES W. COX, a citizen of the United States, residing at Chicago, in the county of Cook and State of Illinois, have invented certain new and useful Improvements in Registering Attachments for Flush-Tanks, of which the following is a specification.

My invention relates more particularly to flush tanks such as are employed in connection with sewage disposal systems. In these systems a tank is commonly employed which is discharged at considerable intervals of time by siphonic action to flush the sewers, and as the periods of discharge depend upon a number of factors, the capacity of the tank, the construction and location of the siphon relative to the bottom of the tank, and more particularly the rate of flow of water into the tank, it is difficult or impossible to predetermine accurately the flushing periods and therefore it is desirable to provide a means such as is the object of my present invention to automatically count the number of operations of the flushing tank. It is a matter of convenience to so construct and arrange the registering apparatus that it may be readily attached to the tank in operative position and as readily removed from time to time for the purpose of reading the same since it is essential or desirable that the device be wholly within the tank during operation, and it is impracticable to read the registering instrument without withdrawing it therefrom.

My invention comprises a float which rises and falls with the level of water within the tank and carries the registering apparatus, the whole being so attached that it can be readily removed from the tank for the purpose of reading the register, and then returned to the tank.

In the accompanying drawing I have shown and in the following specification described a preferred embodiment of my invention. It is to be understood, however, that the specific disclosure is for the purpose of exemplification only, and that the scope of the invention is defined in the following claims in which I have endeavored to distinguish it from the prior art so far as known to me without, however, relinquishing or abandoning any portion or feature thereof.

Figure 1:
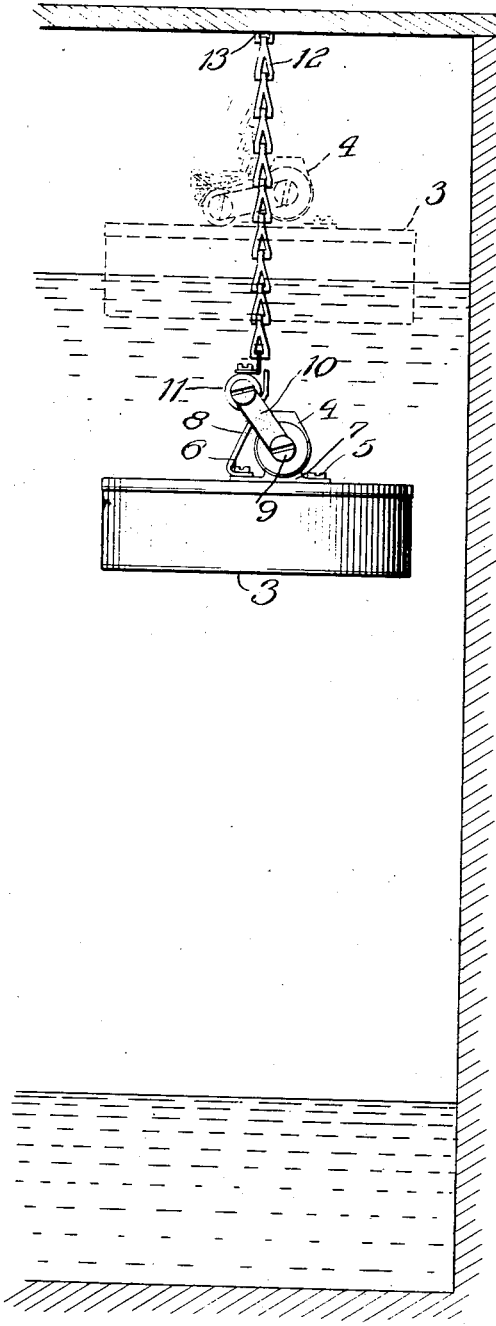
Figure 2:
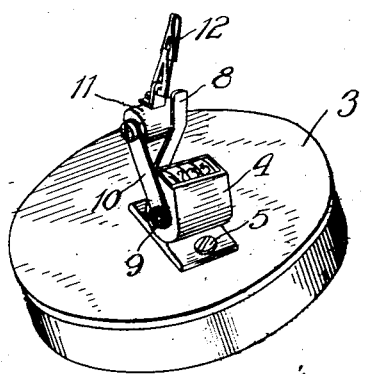

In the drawing, Figure 1 is a section of a tank showing my invention applied thereto in elevation; and Fig. 2 is a perspective of the invention.

The device comprises a float 3 which may be of any form or construction provided that it is capable of supporting the mechanism to be presently described, but is shown as a flat cylinder or drum which may be made of sheet metal. The counting mechanism or register 4 is secured by screws 5 and 6 to the top of the drum and comprises in addition to the register proper a base or support 7 to which is attached a bracket or arm 8 extending upwardly therefrom for a purpose which will presently appear. To the shaft 9 is connected an arm 10 which at its outer end carries a weight 11 of sufficient weight to operate the register when permitted to drop to the upper surface of the float. A chain 12 is attached to the weight and connected at its other end as at 13 to a stationary attachment preferably to the top of the tank and in such position that it may readily be reached by the inspector. The length of the chain is so regulated that before the tank is entirely empty the weighted arm 10 will be raised by the dropping of the float, but when or before the tank is full the float rises sufficiently to drop the weight the distance necessary to rotate the register. The upward movement of the arm 10 is limited by the bracket 8 referred to above. Thus there will be a complete oscillation of the arm and weight at each emptying of the tank and the number of flushing operations will be registered upon the device provided for that purpose. When it is desired to read the register the inspector merely lifts the device by the chain, which as before stated, is arranged within reach from the outside of the tank and reads the register and again drops the device into the tank.

I claim:

1. A device of the class described comprising a float, a register mounted on the float, means for actuating the register including a means for connecting the register to a stationary element.

2. In a device of the class described, a float, a register secured to the float comprising registering wheels and a weighted arm, and a chain for connecting the arm to a stationary attachment.

3. In a device of the class described, a float, a register attached to and supported thereby, said register having a rock shaft, an arm carried by the rock shaft, a stop for limiting the movement of the arm, a weight carried by the arm, and a flexible connection for suspending the device from a stationary support.

JAMES W. COX.